(12) United States Patent
Chew (10) Patent No.: US 7,873,907 B2
(45) Date of Patent: Jan. 18, 2011

(54) TECHNIQUE FOR SEARCHING FOR A SPECIFIC OBJECT IN AN ISPF PANEL FOR AUTOMATED TESTING

(75) Inventor: Sung Fai Chew, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1996 days.

(21) Appl. No.: 10/753,656

(22) Filed: Jan. 7, 2004

(65) Prior Publication Data

US 2005/0149347 A1    Jul. 7, 2005

(51) Int. Cl.
*G06F 3/00* (2006.01)
(52) U.S. Cl. ............... 715/762; 715/767; 715/785
(58) Field of Classification Search ........... 715/767, 715/785
See application file for complete search history.

(56) References Cited

U.S. PATENT DOCUMENTS

| | | | |
|---|---|---|---|
| 4,926,349 A | | 5/1990 | Thor ..................... 364/523 |
| 5,666,492 A | * | 9/1997 | Rhodes et al. ............. 705/3 |
| 5,724,559 A | * | 3/1998 | Masemore ................ 703/26 |
| 5,848,406 A | | 12/1998 | Mani et al. ................ 707/2 |
| 6,043,809 A | * | 3/2000 | Holehan ................ 345/168 |
| 6,067,543 A | | 5/2000 | Burrows .................. 707/4 |
| 6,118,447 A | | 9/2000 | Harel .................... 345/335 |
| 6,184,880 B1 | | 2/2001 | Okada ................... 345/333 |
| 6,223,145 B1 | | 4/2001 | Hearst .................... 703/22 |
| 6,313,848 B1 | | 11/2001 | Hoag ..................... 345/684 |
| 6,384,843 B1 | | 5/2002 | Harel .................... 345/762 |
| 6,557,004 B1 | | 4/2003 | Ben-Shachar et al. ...... 707/102 |
| 6,587,889 B1 | | 7/2003 | Kaminsky ................ 709/316 |
| 6,587,969 B1 | | 7/2003 | Weinberg et al. ........... 714/46 |
| 6,933,928 B1 | * | 8/2005 | Lilienthal ................ 345/173 |
| 7,069,281 B2 | * | 6/2006 | Garthwaite ............... 707/206 |
| 7,379,928 B2 | * | 5/2008 | Cukierman et al. .......... 707/3 |
| 2002/0154159 A1 | * | 10/2002 | Day et al. ................ 345/738 |
| 2003/0226104 A1 | * | 12/2003 | Blazejewski et al. ....... 715/501.1 |
| 2004/0046804 A1 | * | 3/2004 | Chang ................... 345/810 |
| 2006/0085741 A1 | * | 4/2006 | Weiner et al. ............. 715/517 |

FOREIGN PATENT DOCUMENTS

WO    WO 02/061583 A2    8/2002

OTHER PUBLICATIONS

"ISPF table comparison tool", International Business Machines Corporation, Research Disclosure, 439105, Nov. 2000, p. 1989.

(Continued)

*Primary Examiner*—Ryan F Pitaro
(74) *Attorney, Agent, or Firm*—Mollborn Patents, Inc.; Fredrik Mollborn (57) ABSTRACT

A method, apparatus and article of manufacture, implementing the method, finds one or more objects in a scrollable list of a character-based panel for automated testing. The scrollable list comprises objects. A subset of the objects of the scrollable list is displayed in the panel. A first target area in the panel is searched for a first target object. The first target area displays at least a portion of the subset of objects of the scrollable list. When the first target object is not found, a next page command is supplied to display a second subset of objects of the scrollable list and the searching is repeated.

31 Claims, 7 Drawing Sheets

OTHER PUBLICATIONS

J.A. Herrod, "Variable Windowing Implementation," International Business Machines Corporation, Technical Disclosure Bulletin, vol. 32, No. 8B, Jan. 1990, pp. 257-260.

Dennis Beck, "An ISPF Panel Primer," Technical Support, Mar. 1999, Technical Enterprises, Inc., downloaded from http://www.naspa.com/PDF/99/T9903006.pdf.

* cited by examiner

TECHNIQUE FOR SEARCHING FOR A SPECIFIC OBJECT IN AN ISPF PANEL FOR AUTOMATED TESTING

BACKGROUND OF THE INVENTION

1. Field of the Invention

The invention relates to a technique, specifically a method, apparatus, and article of manufacture that implements the method, to search for a specific object in an Interactive System Productivity Facility (ISPF) panel for automated testing.

2. Description of the Related Art

The IBM® (Registered trademark of International Business Machines Corporation) Interactive System Productivity Facility provides an interface and supporting programs that allows a user to configure and manage its system and application programs, and to access datasets. A dataset is also referred to as a file. The ISPF operates in an IBM z/OS® (Registered trademark of International Business Machines Corporation) operating system environment.

The ISPF provides a graphical user interface comprising ISPF panels. ISPF panels are character-based. An ISPF panel appears as a window and has rows and columns. A particular location within the ISPF panel is specified by its column and row number. The uppermost left corner of the ISPF panel is designated as column one, row one. The column numbers increase towards the right side of the ISPF panel, and the row numbers increase towards the bottom of the ISPF panel. Each location in an ISPF panel can display or receive a character depending on how the ISPF panel is configured.

During automated testing of a software product that uses ISPF panels, sometimes a desired object is in a list of objects. For example, the objects in the list may comprise objects from a database table or the objects may be a list of the column names of a database table. Often, the list of objects exceeds the number of rows which can be displayed on the ISPF panel. In other words, only a subset of objects of the list may be able to be displayed in the ISPF panel. Therefore, the list of objects may be manually scrolled to find a desired object.

A software tester application is a computer program that is used to test a software product. The software tester application uses keystroke capture techniques to record keystrokes from a user to generate a test script. To test the ISPF panel, the software tester application replays the keystrokes from the test script. However, if the ISPF panel is changed, for example, the position of a desired object in the scrollable list changes, the keystrokes need to be re-executed to manually regenerate the test script. Manually generating a test script is time consuming and error prone.

In one software tester application, WinRunner® (Registered trademark of Mercury Interactive Corporation), a built-in function called "TE_find_text" can be used to search a specified region of an ISPF panel for a string. The format of the TE_find_text function is: TE_find_text(target-string, x-found-coordinate, y-found-coordinate, $x_1$, $y_1$, $x_2$, $y_2$). The target-string is the specified string or text that the TE_find_text function will search for. The region in the ISPF panel that will be searched is specified by $x_1$, $y_1$, $x_2$ and $y_2$, where $x_1$ and $y_1$ specify a starting column and row, respectively, and $x_2$ and $y_2$ specify an ending column and row, respectively. If the specified text is found, the TE_find_text function provides the column and row associated with the start of the text in the x-found-coordinate and y-found-coordinate, respectively. The TE_find_text function returns a "−1" in the x-found-coordinate and y-found coordinate if the specified text is not found.

Even if the TE_find_text function is used to find a target string in an ISPF panel, the scrollable list is not automatically searched to find the target string if the target string is not displayed.

Therefore, there is a need for a technique that can be called from an automated test script to find an object in a scrollable list in an ISPF panel. The technique should be able to automatically scroll through a list of objects to find the desired object.

SUMMARY OF THE INVENTION

To overcome the limitations in the prior art described above, and to overcome other limitations that will become apparent upon reading and understanding the present specification, the present invention discloses a method, apparatus, and article of manufacture, implementing the method, to find one or more objects in a scrollable list of a character-based panel for automated testing. The scrollable list comprises objects. A subset of the objects of the scrollable list is displayed in the panel. A first target area in the panel is searched for a first target object. The first target area displays at least a portion of the subset of objects of the scrollable list. When the first target object is not found, a next page command is supplied to display a second subset of objects of the scrollable list and the searching is repeated.

In this way, a technique that can be called from an automated test script to find an object in a scrollable list of a character-based panel, and more particularly, an ISPF panel, is provided.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to some of the figures.

DETAILED DESCRIPTION OF THE PREFERRED EMBODIMENTS

After considering the following description, those skilled in the art will clearly realize that the teachings of the present invention can be utilized to search for a specific object in a scrollable list of a character-based panel, and more particularly, an ISPF panel, for automated testing. A method, apparatus and article of manufacture, implementing the method, finds one or more objects in a scrollable list of a panel. The scrollable list comprises objects. A subset of the objects of the scrollable list is displayed in the panel. A first target area in the panel is searched for a first target object. The first target area displays at least a portion of the subset of objects of the scrollable list. When the first target object is not found, a next page command is supplied to display a second subset of objects of the scrollable list and the searching is repeated.

Figure 1:
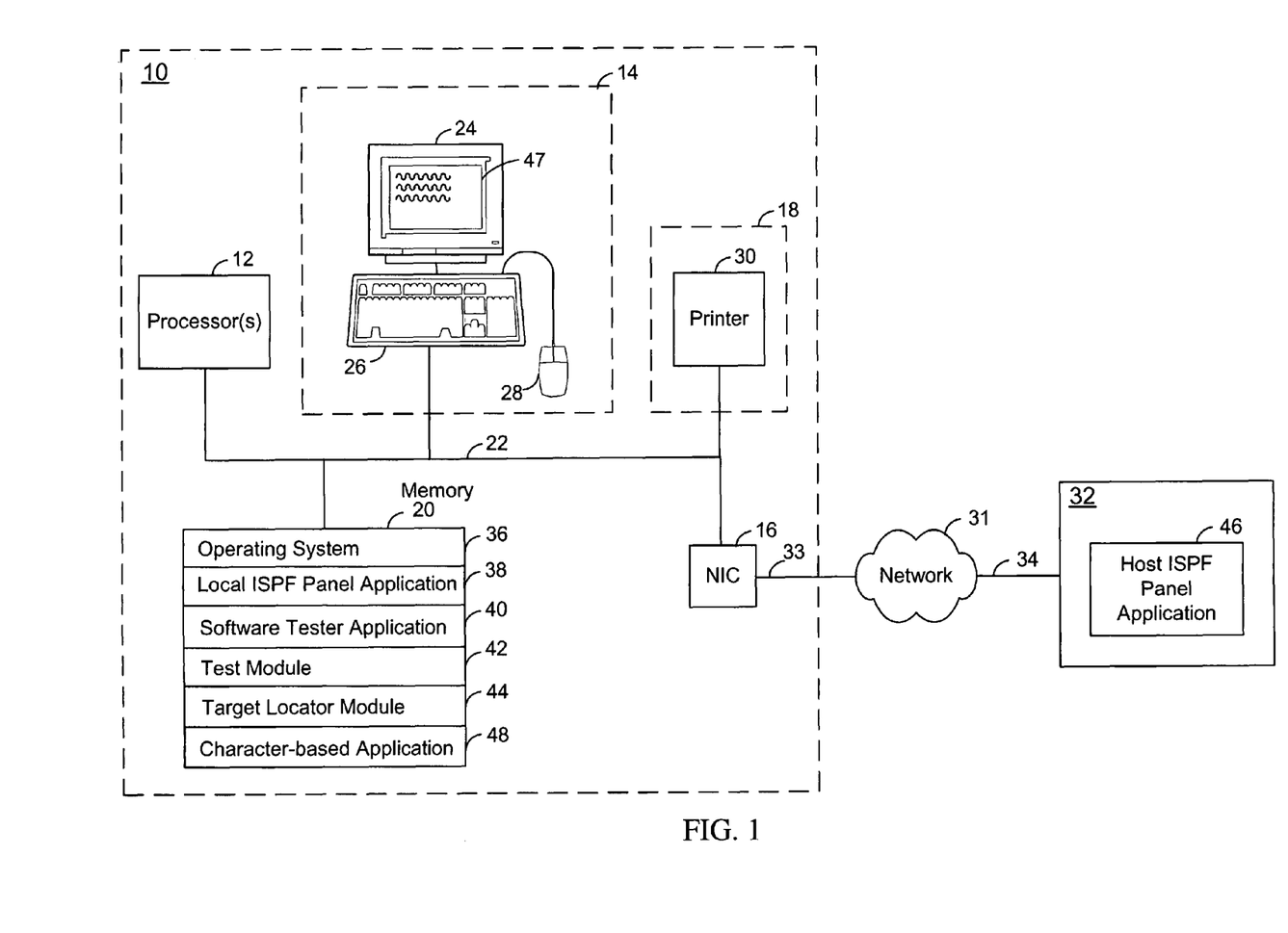
FIG. 1 depicts an illustrative computer system that uses the teachings of the present invention.

FIG. 1 depicts an illustrative local computer system 10 that utilizes the teachings of the present invention. The local computer system 10 comprises one or more processors 12, user interfaces 14, a communications interface 16, an output interface 18 and memory 20, all conventionally coupled by one or more busses 22. The user interfaces 14 comprise a display 24, a keyboard 26 and a mouse 28. The output interface 18 is a printer 30. The communications interface 16 is a network interface card (NIC) that allows the local computer system 10 to communicate via a network 31, such as the Internet. For example, the NIC may be used to communicate with a host computer 32.

The communications interface 16 may be coupled to a first transmission medium 33 such as, for example, twisted pair, coaxial cable or fiber optic cable. In another exemplary embodiment, the communications interface 16 provides a wireless interface. A second transmission medium 34 couples the host computer 32 to the network 31.

The memory 20 generally comprises different modalities, illustratively semiconductor memory, such as, for example, random access memory (RAM), and a disk drive. In some embodiments, the memory 20 stores an operating system 36, a local ISPF panel application 38, a software tester application 40, a test module 42 and a target locator module 44.

The host computer 32 stores and executes a host ISPF panel application 46. In response to a request from the local ISPF panel application 38, the host ISPF panel application 46 creates the ISPF panel data and sends that data to the local ISPF panel application 38 on the local computer system 10. The local ISPF panel application 38 displays the ISPF panel data on the display 24 as an ISPF panel 47. The local ISPF panel application 38 also receives responses to the ISPF panel 47 and sends those responses to the host ISPF panel application 46.

In an alternate embodiment, in the local computer system 10, the memory 20 stores a character-based application 48 that generates character-based panel data and displays the character-based panel data on the display 24 as a character-based panel. The character-based panel application also receives and processes responses to the character-based panel. In another alternate embodiment, the character-based application, similar to the ISPF application, receives character-based panel data from a host computer.

In the local computer system 10, the operating system 32 may be the z/OS operating system. In alternate embodiments, the operating system may be an IBM AIX® (Registered Trademark of International Business Machines Corporation) operating system, a UNIX® (UNIX is a registered trademark of The Open Group in the United States and other countries) operating system, a LINUX® (Registered Trademark of Linus Torvalds) operating system or a WINDOWS® (Registered Trademark of Microsoft Corporation) operating system. In the host computer 32, the operating system is typically the z/OS operating system.

The software tester application 40 executes the test module 42 to test the ISPF panel 47. In one embodiment, the test module 42 is a test script. For example, in one embodiment, the software tester application 40 is WinRunner. However, the present inventive technique is not meant to be limited to WinRunner and may be used with other software tester applications.

The present inventive technique is incorporated in the target locator module 44. In one embodiment the target locator module 44 is separate from the test module 42. Alternately, the target locator module 44 is part of the test module 42.

Generally, the target locator module 44 incorporating the present inventive technique is tangibly embodied in a computer-readable device, carrier or medium, for example, memory 20, and is comprised of instructions which, when executed, by the one or more processor(s) 12 of the local computer system 10, causes the local computer system 10 to utilize the present invention.

The present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device or media. Those skilled in the art will recognize that many modifications may be made to this configuration without departing from the scope of the present invention.

The exemplary computer system illustrated in FIG. 1 is not intended to limit the present invention. Other alternative hardware environments may be used without departing from the scope of the present invention.

The present inventive technique will described with respect to ISPF panels. However, the present inventive technique is not meant to be limited to ISPF panels and may be used with other character-based panels.

Figure 2A:
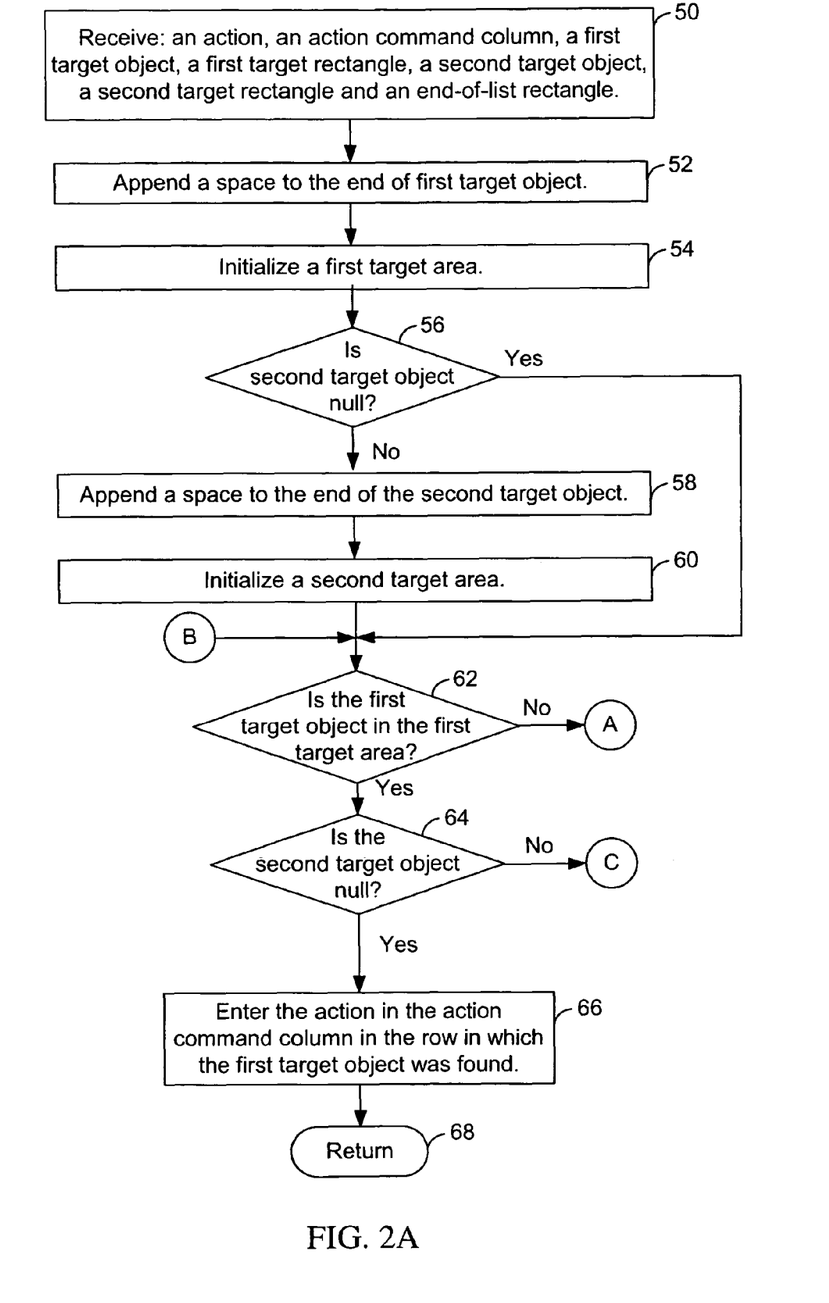
FIGS. 2A, 2B and 2C collectively depict a flowchart of a technique for searching for a specific object in a scrollable list of an ISPF panel for automated testing.
Figure 2B:
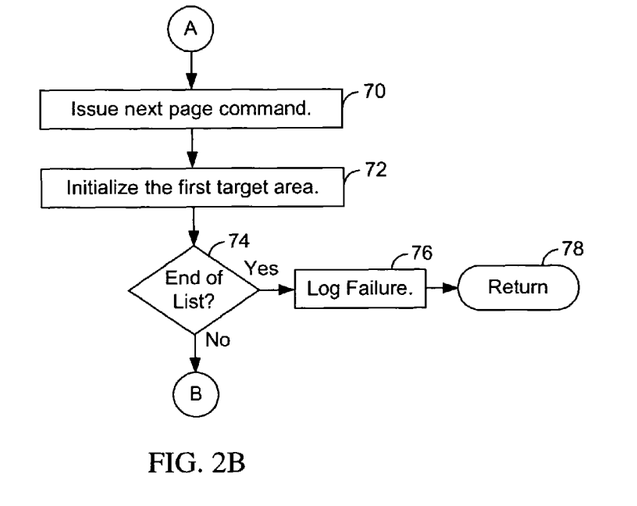
Figure 2C:
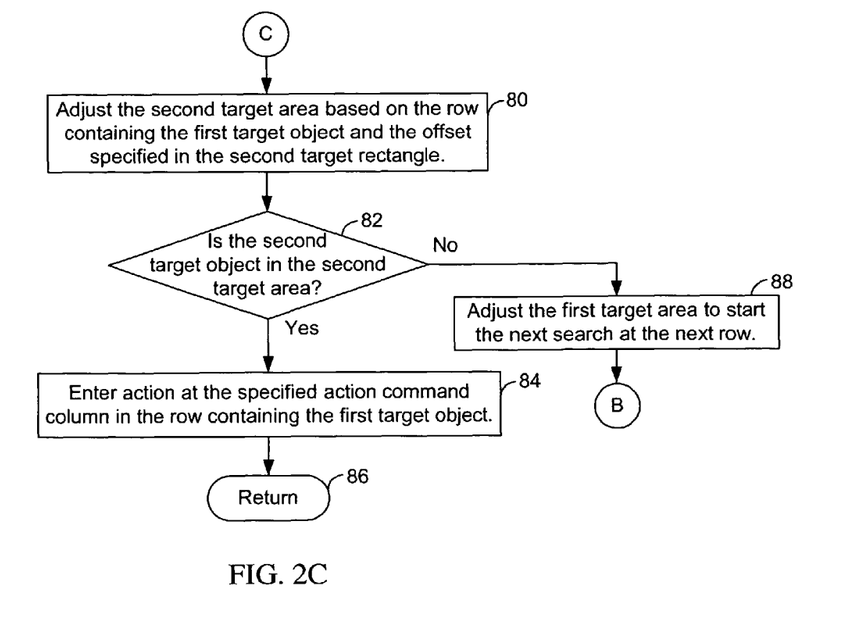

FIG. 2 depicts a flowchart of an embodiment of the present inventive technique implemented in the target locator module 44 of FIG. 1. In step 50, input parameters are received. The input parameters comprise an action, an action command column, a first target object, a first target rectangle, a second target object, a second target rectangle and an end-of-list rectangle. The action defines a command, for example, a character that will be input in a row associated with a found target object, at the column specified by the action command column. In an alternate embodiment, the second target object and second target rectangle are omitted.

The first target rectangle specifies a rectangular area that contains a subset of objects of the scrollable list. In one embodiment, the first target rectangle defines the boundaries of the rows and columns associated with displaying a scrollable list in an ISPF panel. The first target rectangle is defined by first-target-rectangle starting and ending x-y coordinates, $(x'_1, y'_1)$ and $(x'_2, y'_2)$, respectively. The x-coordinate specifies a column and the y-coordinate specifies a row. Alternately, the first target rectangle specifies the rows and a subset of the columns associated with displaying a scrollable list in an ISPF panel.

The second target rectangle, if provided, specifies a rectangular area associated with the display of the second target object. The second target rectangle is defined by second-target-rectangle starting and ending x-y coordinates, $(x''_1, y''_1)$ and $(x''_2, y''_2)$, respectively. In one embodiment, the second target object may be offset from the row containing the first target object. In a more particular embodiment, the second target object may be offset from the row containing the first target object by the value of $y''_1$. In an alternate embodiment, the second target object and second target rectangle are omitted.

The end-of-list rectangle specifies a region in which to search for an end-of-list indicator. The end-of-list rectangle is defined by end-of-list rectangle starting and ending x-y-coordinates, $(x_{b1}, y_{b1})$ and $(x_{b2}, y_{b2})$, respectively.

The first target object is a string, and in another embodiment, the second target object is a string. The present inventive technique will be described with respect to first and second target objects that are strings.

In step 52, a space is appended to the end of the first target object. The space is appended so that, for a string target object, a sequence of characters matching the first target object that is embedded in another object is ignored. In an alternate embodiment, step 52 is omitted and a space is not appended to the first target object.

In step 54, a first target area is initialized to equal the first target rectangle. In another embodiment, a first-target-area starting x-y coordinate is set equal to the first target rectangle starting x-y-coordinate. A first-target-area ending x-y coordinate is set as follows. The first-target-area ending row is set equal to the first-target-rectangle ending row, $y'_2$. The first-target-area ending column is set equal to the first target rectangle starting column, $x'_1$, plus the length of the first target object. In other words, the first-target-area ending x-y coordinate is equal to ($x'_1$+length of first target object, $y'_2$). In this way, by reducing the size of the area to search, an exact match can be found quickly.

Step 56 determines if the second target object is null. If not, in step 58, a space is appended to the end of the second target object. The space is appended to the end of the second target object for the same reason as the space was appended to the first target object in step 52. In an alternate embodiment, step 56 is omitted and a space is not appended to the second target object.

In step 60, a second target area is initialized to equal the second target rectangle, except that the ending column of the second target area is set equal to the sum of the value of the starting column of the second target area $x''_1$ and the length of the second target object.

Alternately, a second target object is not used and steps 56, 58 and 60 are omitted. If step 56 determines that the second target object is null, the target locator module proceeds to step 62.

Step 62 determines if the first target object is in the first target area. In particular, step 62 searches the first target area for the first target object. In a more particular embodiment, for example, using WinRunner, the built-in function called "TE_find_text," described above, is used to search the first target area for the first target string. When the specified text is found, the TE_find_text function provides the row and column associated with the start of the first target object as the first target-found row and the first target-found column, respectively. In an alternate embodiment, a function other than the TE_find_text function may be used.

When, in step 62, the first target object is found, step 64 determines if the second target object is null. If so, in step 66, the action is entered at the specified action command column in the row, the first target-found row, which contains the first target object. In step 68, the target locator module returns to the calling program. Alternatively, step 64 is omitted and when the first target string is found, step 62 proceeds to step 66.

When step 62 determines that the first target object is not in the first target area, the flowchart proceeds via continuator A to step 70 of FIG. 2B. In step 70, the target locator module issues a next page command to scroll the scrollable list. Another subset of objects of the scrollable list is displayed. In one embodiment, the next page command is a page down key, for example, an "f8", which is equivalent to pressing the f8 key on a keyboard. Alternatively, the next page command can be defined as being equivalent to pressing other keys. In step 72, the first target area is initialized as in step 54.

Step 74 determines if the end of the scrollable list has been reached. In one embodiment, step 74 searches for a predetermined end-of-list indicator within the specified end-of-list rectangle. In one embodiment, the end-of-list rectangle is specified as being in the top row of the first target rectangle starting at a specified column. For example, in one embodiment, the predetermined end-of-list indicator is a string such as "Bottom of data". Alternately, other end-of-list indicators may be used. For example, in another embodiment, the TE_find_text function, described above, is used to search for the predetermined end-of-list indicator. When step 74 does not find the predetermined end-of-list indicator, the target locator module continues, via continuator B, to step 62 of FIG. 2A to search the new subset of objects of the scrollable list that is displayed. When step 74 finds the predetermined end-of-list indicator, in step 76, the target locator module logs the failure to find the first target object and, in some embodiments, the second target object, and in step 78, returns to the calling module.

When step 64 determines that the second target object is not null, the target locator module proceeds via continuator C to step 80 of FIG. 2C. In step 80, the second target area is adjusted based on the row containing the first target object and the offset specified in the second target rectangle. The starting and ending rows of the second target area are set equal to the row containing the first target object, that is, the first target-found row of the first target object plus an offset. In one embodiment, the second-target-rectangle starting row, $y''_1$ is used as the offset to calculate the second-target-area starting row. The second-target-area starting row is set equal to the sum of the first target-found row plus the offset $y''_1$. The ending row of the second target area is then set equal to the starting row of the second target area.

Step 82 searches for the second target object in the second target area. For example, in one embodiment, the TE_find_text function, described above, is used to search for the second target object. When the second target object is found, in step 84, the specified action is entered in the row containing the first target object in the column specified by the action command column. In step 86, the target locator module returns to the calling module.

When, in step 82, the second target object is not found in the second target area, in step 88, the first target area is adjusted to start the search at the next row. In other words, the portion of the first target area that was already searched is removed from the first target area. The target locator module proceeds, via continuator B, to step 62 of FIG. 2A.

In another alternate embodiment of step 80, the second target area is offset from the first target object by a specified number of columns. For example, the second target area starting column $x''_1$ is used as an offset, such that the second target area starting column is equal to the sum of the first target-found column plus the offset $x''_1$. In another alternate embodiment, the second target area is offset from the first target object by a specified number of rows and columns.

Figure 3:
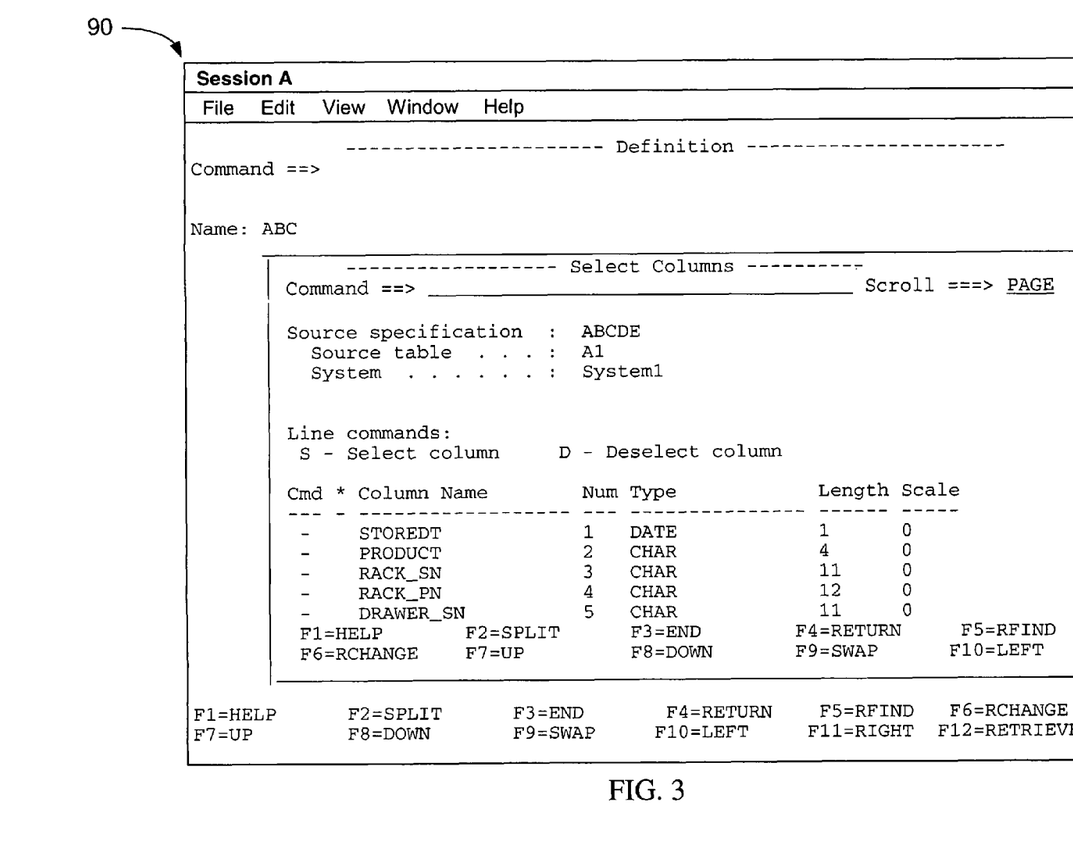
FIG. 3 depicts an exemplary ISPF panel that displays a first subset of objects of a scrollable list that was generated by an embodiment of the host ISPF panel application of FIG. 1.
Figure 4:
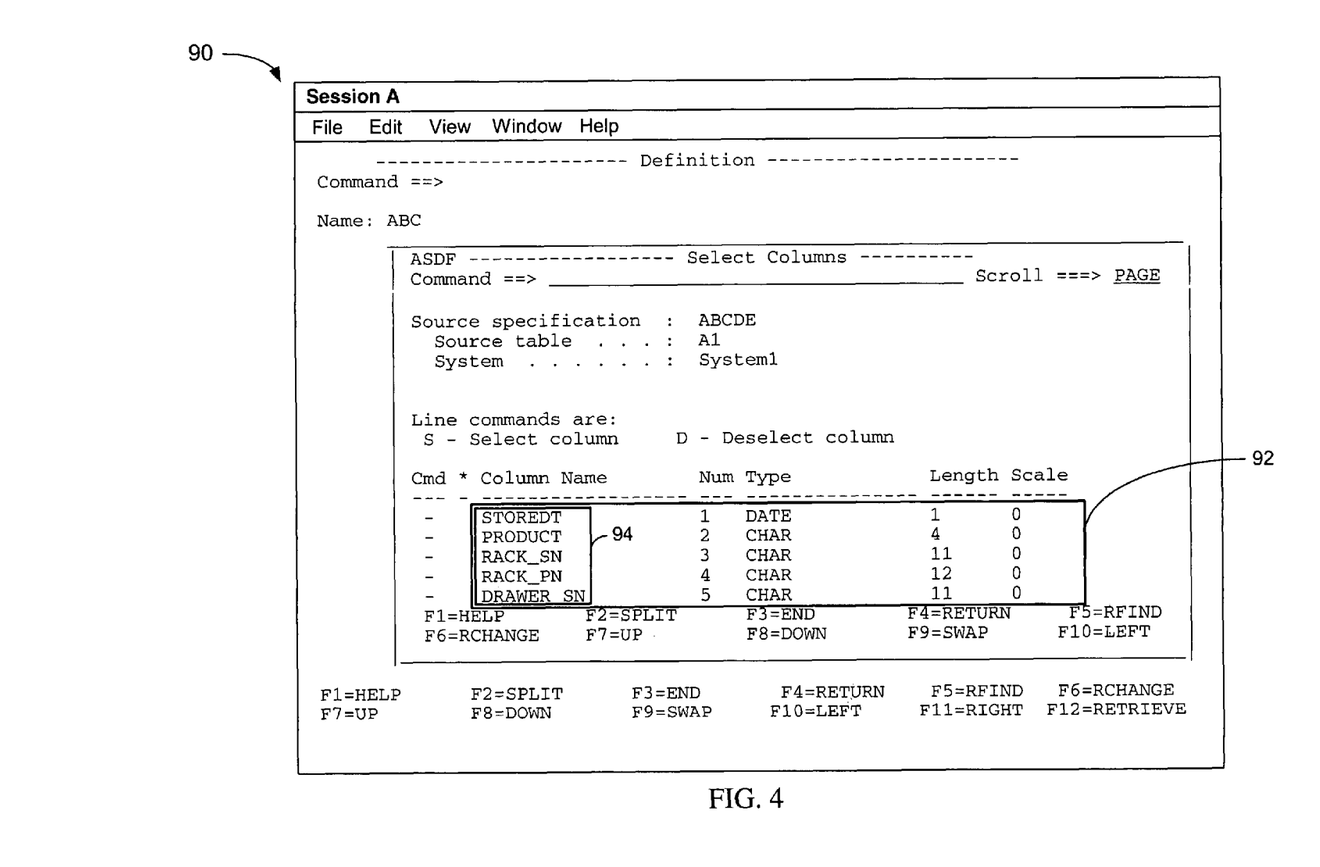
FIG. 4 depicts a first target area associated with the scrollable list of the exemplary ISPF panel of FIG. 3.

FIG. 3 depicts an exemplary ISPF panel 90 generated by the ISPF panel application of FIG. 1 to be tested using the present inventive technique. FIG. 4 depicts the exemplary ISPF panel 90 of FIG. 3 and illustrates a first target rectangle 92 of the scrollable list with a first target area 94 within the first target rectangle 92. For example, assume that the first target object is a string called "RUN_DATE." Assume that the first target rectangle 92 is defined by rows twenty to twenty-four, and columns fifteen to sixty-five, in other words, that the starting and ending x-y coordinates of the first target rectangle are (15, 20) and (65, 24), respectively. The length of RUN_DATE, including the appended space, is equal to nine.

Therefore, the starting and ending x-y-coordinates of the first target area are equal to (15, 20) and (24, 24), respectively (step 54, FIG. 2A). In this example, the second target object is null (step 56, FIG. 2A). The first target area 94 of FIG. 4 is searched (step 62, FIG. 2A), and the first target object is not found.

Figure 5:
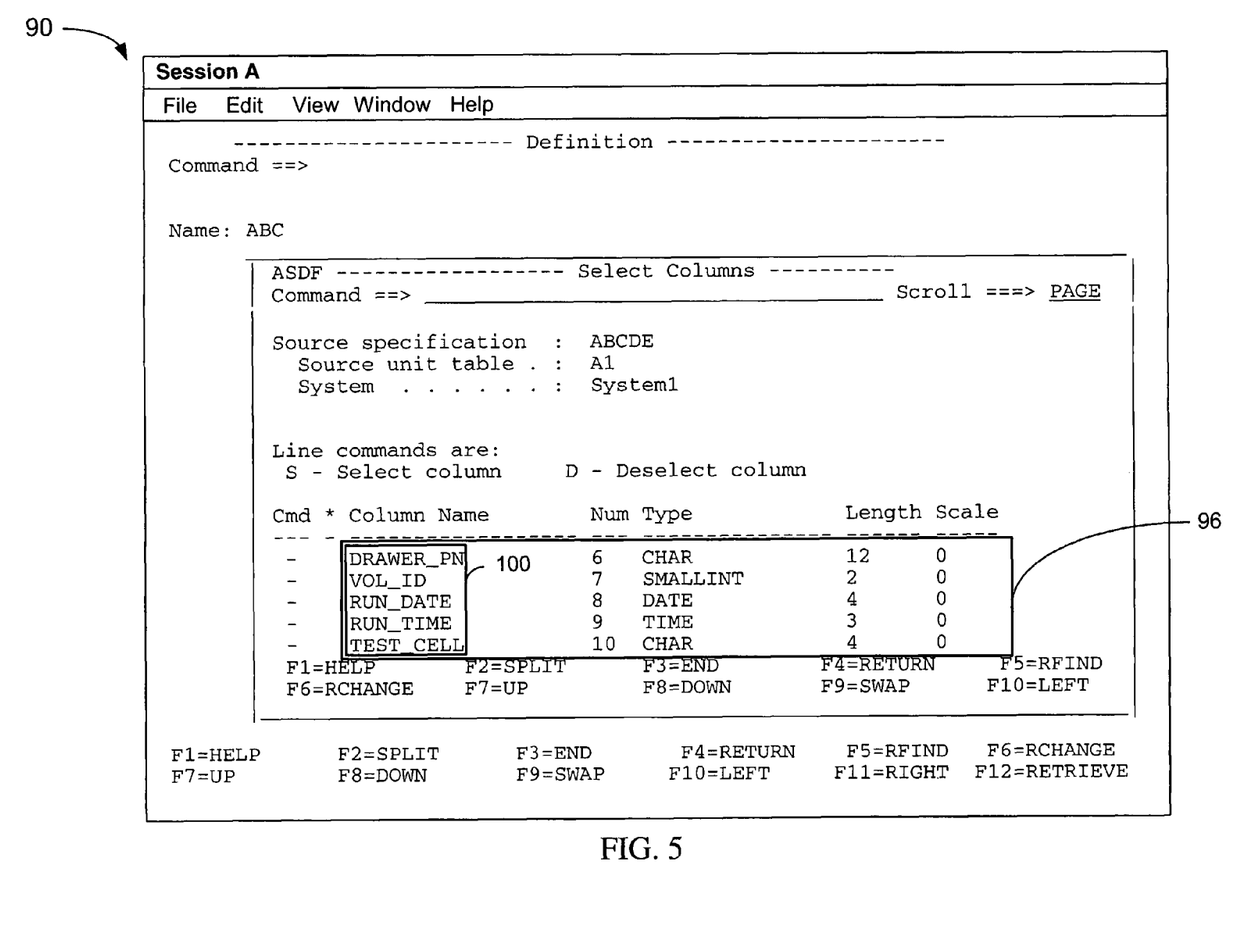
FIG. 5 depicts a second subset of objects of the scrollable list that are displayed in the exemplary ISPF panel of FIG. 3.

Referring also to FIG. 5, a next page command is issued (step 70, FIG. 2B), to display another subset of objects of the scrollable list as shown in the rectangle 96 in the ISPF panel 90. The first target area 100 is within the first target rectangle 96 (step 72, FIG. 2B). Since the end-of-list has not been received (step 74, FIG. 2B), a search of the first target area for this ISPF panel 98 is performed for the first target object (step 62, FIG. 2A). The search finds the first target object, "RUN_DATE," in row twenty-two, column fifteen. Assuming that the second target object is null, the target locator module issues the specified action at the specified action command column in row twenty-two.

In another example, now assume that a second target object, called "DATE" is specified and that its starting row coordinate $y''_1$, that is, the offset, is equal to zero, that is, zero rows below the target-found row of the first target object. The starting location of the second target object is equal to row twenty-two plus the value of the offset, zero, which is equal to row twenty-two. The second target object has an appended blank. The length of the second target object is equal to five. Assuming that the starting column for the second target area is equal to thirty-seven, the ending column for the second target area is equal the sum of the value of the starting column for the second target area, thirty-seven, and the length of the second target object, five. Therefore, the ending column for the second target area is equal to forty-two. Thus, the second target area is defined by row twenty-two, from columns thirty-seven to forty-two (step 80, FIG. 2C). A search of the second target area for "DATE" is performed (step 62, FIG. 2A). The search finds the second target object, and a specified action is performed at the specified action command column in row twenty-two (step 84, FIG. 2C).

Figure 6:
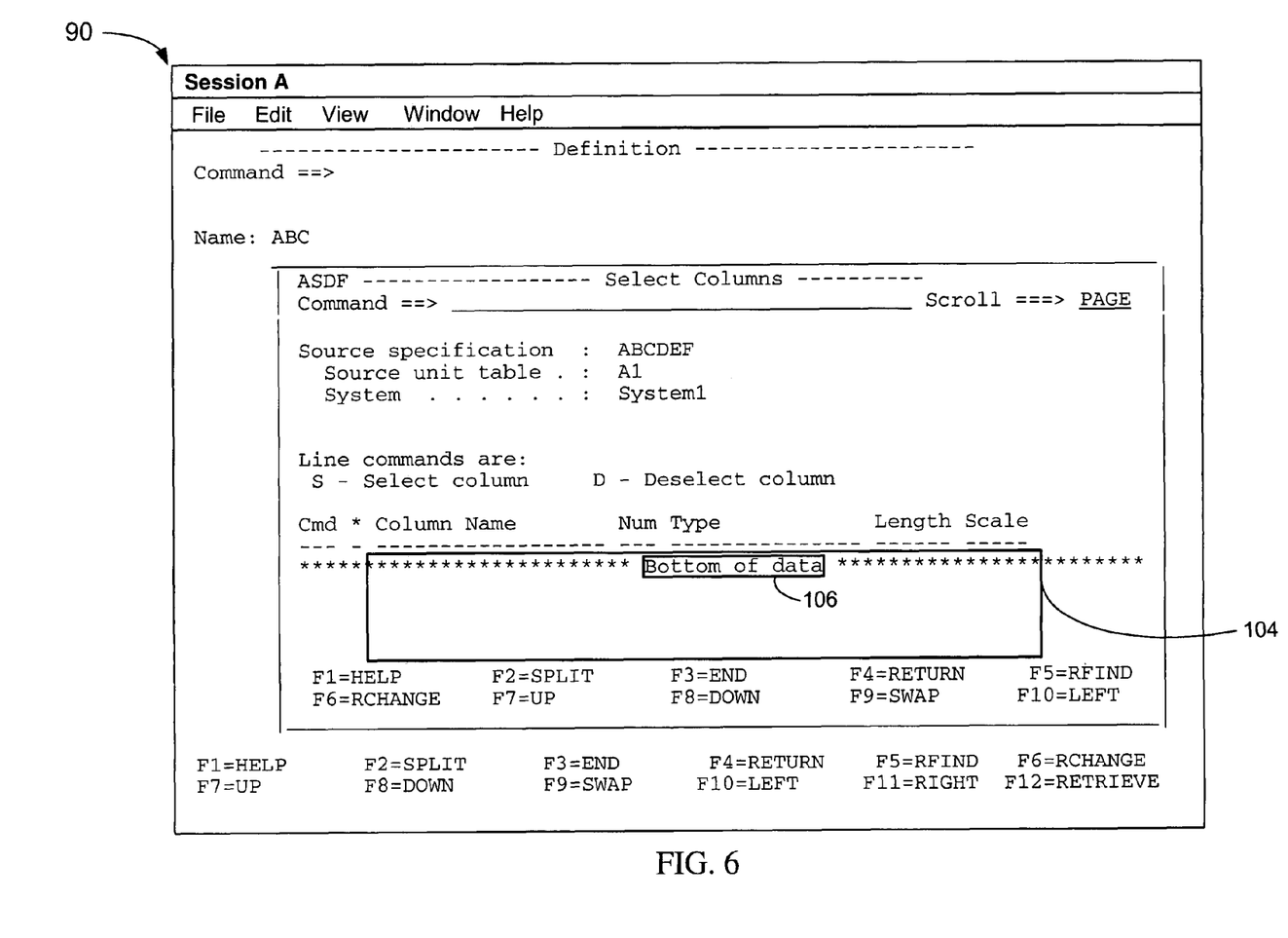
FIG. 6 depicts an end-of-list indicator for the scrollable list that is displayed in the exemplary ISPF panel of FIG. 3.

When the second target object is not found, the first target area is adjusted to remove the area already searched. The first target area is now defined by rows twenty-three to twenty-four, and columns fifteen to sixty-five (step 88, FIG. 2C). A search is performed of the first target area (step 62, FIG. 2A). Assume that the first target object is not found. A next page command is issued (step 70, FIG. 2B), and scrollable list of the ISPF panel 90 is updated as shown in FIG. 6. In FIG. 6, the scrollable list area, that is, the first target rectangle, 104 is empty except for an end-of-list indicator, for example, "Bottom of data." A search is performed for the end-of-list indicator in the specified end-of-list rectangle 106, and the end-of-list indicator is found. In this example, the first and second target objects were not found. The target locator module logs the failure to find the target objects (step 76, FIG. 2B), and the target locator module returns to the calling module (step 78, FIG. 2B).

In the preceding example, the offset was equal to zero. Alternately, the offset may have a positive integer value. In another alternate embodiment, the offset may have a negative integer value.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended thereto.

What is claimed is:

1. A method of finding one or more objects in a scrollable list of a character-based panel for automated testing, comprising:
   providing a scrollable list of a character-based panel for automated testing, the scrollable list including one or more objects, wherein a subset of the objects of the scrollable list are displayed in the panel;
   searching a first target area of the panel for a first target object, wherein the first target area displays at least a portion of the subset of objects of the scrollable list; and
   in response to not finding the first target object in the first target area, supplying a next page command to display a second subset of objects of the scrollable list and repeating said searching.

2. The method of claim 1 further comprising:
   in response to not finding the first target object, searching a second target area for a second target object.

3. The method of claim 2 wherein the second target area is offset from the first target object.

4. The method of claim 3 wherein the second target area is offset from the first target object by a specified number of rows.

5. The method of claim 2 further comprising:
   in response to not finding the second target object, adjusting the first target area such that the first target area begins below a row containing the first target object to provide an adjusted target area; and
   searching the adjusted target area for the first target object.

6. The method of claim 1 further comprising:
   determining whether an end of the scrollable list has been reached; and
   in response to determining that the end of the scrollable list has not been reached, repeating said searching.

7. The method of claim 6 wherein said determining comprises searching a specified end-of-list rectangle for an end-of-list indicator such that when the end-of-list indicator is found, the end of the scrollable list has been reached.

8. The method of claim 1 wherein the panel is an Interactive System Productivity Facility panel.

9. An apparatus for finding one or more objects in a scrollable list of a character-based panel for automated testing, comprising:
   a processor; and
   a memory storing one or more instructions to be executed by the processor, the instructions including instructions to:
       provide a scrollable list of a character-based panel for automated testing, the scrollable list including one or more objects, wherein a subset of the objects of the scrollable list are displayed in the panel;
       search a first target area in the panel for a first target object wherein the first target area displays at least a portion of the subset of objects of the scrollable list; and
       in response to not finding the first target object in the first target area, supply a next page command to display a second subset of the scrollable list and repeating said searching.

10. The apparatus of claim 9 wherein said one or more instructions also:
    in response to not finding the first target object, search a second target area for a second target object.

11. The apparatus of claim 10 wherein the second target area is offset from the first target object.

12. The apparatus of claim 11 wherein the second target area is offset from the first target object by a specified number of rows.

13. The apparatus of claim 10, wherein said one or more instructions also include instructions to:
adjust the first target area such that the first target area begins below a row containing the first target object to provide an adjusted target area, in response to not finding the second target object; and
search the adjusted target area for the first target object.

14. The apparatus of claim 9 wherein said one or more instructions also include instructions to:
determine whether an end of the scrollable list has been reached; and
in response to determining that the end the end of the scrollable list has not been reached, repeat said search.

15. The apparatus of claim 14 wherein said one or more instructions to determine comprise searching a specified end-of-list rectangle for an end-of-list indicator such that when the end-of-list indicator is found, the end of the scrollable list has been reached.

16. The apparatus of claim 9 wherein the panel is an Interactive System Productivity Facility panel.

17. A computer program product for finding one or more objects in a scrollable list of a character-based panel for automated testing, the computer program product comprising:
a tangible computer readable storage medium having computer readable program code embodied therewith, the computer readable program code comprising:
computer readable program code configured to provide a scrollable list of a character-based panel for automated testing, the scrollable list including one or more objects, wherein a subset of the objects of the scrollable list are displayed in the panel;
computer readable program code configured to search a first target area in the panel for a first target object, wherein the first target area displays at least a portion of the subset of objects of the scrollable list; and
computer readable program code configured to supply a next page command to display a second subset of objects of the scrollable list and repeating said searching, in response to not finding the first target object.

18. The computer program product of claim 17, wherein the computer readable program code further comprises:
computer readable program code configured to search a second target area for a second target object, in response to not finding the first target object.

19. The computer program product of claim 18 wherein the second target area is offset from the first target object.

20. The computer program product of claim 19 wherein the second target area is offset from the first target object by a specified number of rows.

21. The computer program product of claim 18, wherein the computer readable program code further comprises:
computer readable program code configured to adjust the first target area such that the first target area begins below a row containing the first target object to provide an adjusted target area, in response to not finding the second target object; and
computer readable program code configured to search the adjusted target area for the first target object.

22. The computer program product of claim 17, wherein the computer readable program code further comprises:
computer readable program code configured to determine whether an end of the scrollable list has been reached; and
computer readable program code configured to repeat the searching, in response to determining that the end of the scrollable list has not been reached.

23. The computer program product of claim 22 wherein the computer readable program code configured to determine comprises:
computer readable program code configured to search a specified end-of-list rectangle for an end-of-list indicator such that when the end-of-list indicator is found, the end of the scrollable list has been reached.

24. The computer program product of claim 17 wherein the panel is an Interactive System Productivity Facility panel.

25. A computer program product for finding one or more objects in a scrollable list of an Interactive System Productivity Facility panel for automated testing, the computer program product comprising:
a tangible computer readable storage medium having computer readable program code embodied therewith, the computer readable program code comprising:
computer readable program code configured to provide a scrollable list of an Interactive System Productivity Facility panel for automated testing, the scrollable list including one or more objects, wherein a subset of the objects of the scrollable list are displayed in the Interactive System Productivity Facility panel;
computer readable program code configured to search a first target area in the Interactive System Productivity Facility panel for a first target object, wherein the first target area displays at least a portion of the subset of objects of the scrollable list; and
computer readable program code configured to supply a next page command to display a second subset of objects of the scrollable list and repeating said searching, in response to not finding the first target object.

26. The computer program product of claim 25, wherein the computer readable program code further comprises:
computer readable program code configured to search a second target area for a second target object, in response to not finding the first target object.

27. The computer program product of claim 26 wherein the second target area is offset from the first target object.

28. The computer program product of claim 27 wherein the second target area is offset from the first target object by a specified number of rows.

29. The computer program product of claim 26, wherein the computer readable program code further comprises:
computer readable program code configured to adjust the first target area such that the first target area begins below a row containing the first target object to provide an adjusted target area, in response to not finding the second target object; and
computer readable program code configured to search the adjusted target area for the first target object.

30. The computer program product of claim 25, wherein the computer readable program code further comprises:
computer readable program code configured to determine whether an end of the scrollable list has been reached; and
computer readable program code configured to repeat the searching, in response to determining that the end of the scrollable list has not been reached.

31. The computer program product of claim 30 wherein the computer readable program code configured to determine comprises:
computer readable program code configured to search a specified end-of-list rectangle for an end-of-list indicator such that when the end-of-list indicator is found, the end of the scrollable list has been reached.

* * * * *